United States Patent
Weir et al.

(10) Patent No.: US 10,981,472 B2
(45) Date of Patent: Apr. 20, 2021

(54) ADJUSTING DEVICE FOR A VEHICLE SEAT

(71) Applicant: Brose Fahrzeugteile GmbH & Co. Kommanditgesellschaft, Coburg, Coburg (DE)

(72) Inventors: Raymond Weir, Oxford, MI (US); Guiying Cui, Shelby Township, MI (US)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 14 days.

(21) Appl. No.: 16/264,424

(22) Filed: Jan. 31, 2019

(65) Prior Publication Data

US 2020/0247277 A1 Aug. 6, 2020

(51) Int. Cl.
*B60N 2/02* (2006.01)

(52) U.S. Cl.
CPC ......... *B60N 2/0284* (2013.01); *B60N 2/0232* (2013.01)

(58) Field of Classification Search
CPC ................ B60N 2/0284; B60N 2002/0288
See application file for complete search history.

(56) References Cited

U.S. PATENT DOCUMENTS

| 1,685,770 | A | * | 10/1928 | Bowen | B60N 2/0284 297/326 |
|---|---|---|---|---|---|
| 2003/0111888 | A1 | * | 6/2003 | Brennan | B60N 2/0284 297/316 |
| 2007/0132293 | A1 | * | 6/2007 | Moriyama | B60N 2/0284 297/337 |
| 2017/0349062 | A1 | * | 12/2017 | Lorey | B60N 2/0745 |
| 2018/0099595 | A1 | * | 4/2018 | Kondrad | B60N 2/0232 |
| 2019/0135139 | A1 | * | 5/2019 | Ioppolo | B60N 2/0284 |
| 2019/0217746 | A1 | * | 7/2019 | Okubo | B60N 2/68 |
| 2020/0094710 | A1 | * | 3/2020 | Reader | B60N 2/0232 |

FOREIGN PATENT DOCUMENTS

| CN | 2015030018142-00001 | | 8/2015 | | |
|---|---|---|---|---|---|
| DE | 102008043196 | A1 * | 4/2010 | ......... | B60N 2/0284 |
| DE | 202016107014 | U1 * | 2/2017 | ......... | B60N 2/0284 |
| DE | 102018123873 | A1 * | 3/2019 | ......... | B60N 2/72 |
| DE | 102018218197 | A1 * | 6/2019 | ......... | B60N 2/62 |
| WO | WO-2008031583 | A2 * | 3/2008 | ......... | B60N 2/286 |

* cited by examiner

*Primary Examiner* — Timothy J Brindley
(74) *Attorney, Agent, or Firm* — Lewis Roca Rothgerber Christie LLP (57) ABSTRACT

An adjusting device for a vehicle seat is provided, the adjusting device may include, comprising: a first element; a second element having guide slots; and guide bolts, each of which being fixedly connected with the first element, slidably engaging one of the guide slots such that the second element is adjustable relative to the first element, and securing the second element to the first element; wherein the guide slots are engaged by the guide bolts and at least one other component.

8 Claims, 8 Drawing Sheets

ADJUSTING DEVICE FOR A VEHICLE SEAT

FIELD

The present disclosure relates to an adjusting device for a vehicle seat.

BACKGROUND

Adjusting devices for vehicle seats may provide an ergonomic adaption of a vehicle seat to a specific user. For example, users with different leg lengths may need different seat cushion lengths.

SUMMARY

It is an object to provide an improved adjusting device for a vehicle seat.

According to a first embodiment, an adjusting device for a vehicle seat comprises a first element (e.g., a base plate), a second element (e.g., a cushion carrier) having guide slots, and one or more guide bolts, each of the one or more guide bolts being fixedly connected to the first element, slidably engaging one of the guide slots such that the second element is adjustable relative to the first element and securing the second element to the first element. Therein, the guide slots are engaged by the one or more guide bolts and at least one other component.

Such an adjusting device may particularly comprise fewer guide bolts than guide slots and may be manufactured with a reduced number of parts.

At least one guide slot or each of the guide slots may receive one of the guide bolts or another component.

As another option, at least one guide slot or each of the guide slots may receive one of the guide bolts and, additionally, one other component. The adjusting device may include more than one other component. The other component(s) is/are different from the guide bolts.

According to an embodiment, the at least one other component is or includes a guide pin fixed to the first element. The guide pin may not include a bolt head so that it may be spaced apart (e.g. retracted) from a part of a seat cushion that is attached to the second element. Because the guide pin is spaced apart from the seat cushion part, the seat cushion part may be protected against wear. Further, the weight of the adjusting device may be reduced and the manufacturing of the adjusting device may be simplified since only few bolts need to be assembled.

According to one or more embodiments, at least one other component may include a slide bushing that may be fixed to the second element and configured to guide one of the guide bolts. Wear between the slide bushing and one of the guide bolts may be mitigated by using a low-friction material combination for the slide bushing and the guide bolt.

The at least one other component may be or include a cover part covering the corresponding guide slot and a bolt head of a guide bolt engaging this guide slot. The cover part may be attached to a slide bushing of the other component. Such a cover may prevent a guide bolt from scraping against a part of a seat cushion (e.g. a foam) attached to the second element to reduce wear.

The at least one other component may comprise plastics or may be made of plastics. Optionally, the other component is made in one piece, in particular in one piece of plastics.

One or some of the guide bolts each, or each of the guide bolts, may be a shoulder bolt. This may provide a particularly robust design.

According to an embodiment, said guide slots may include a number of four guide slots. The guide slots (of any plural number) may be arranged parallel to one another. This may, e.g., prevent the second element from rotating relative to the first element.

The adjusting device may be a seat-depth adjuster. The seat-depth adjuster may be adapted to adjust a length of a seat cushion of the vehicle seat. The second element can be adapted to support a seat cushion part. The first element may be fixed relative to a seat base supporting the vehicle seat and/or to a seat cushion part adjacent to a backrest of the vehicle seat.

The adjusting device may further comprise a drive motor adapted for adjusting a position of the second element relative to the first element.

According to another embodiment, an adjusting device for a vehicle seat comprises a first element, a second element having guide slots, and guide elements, wherein each of the guide elements are fixedly connected with the first element and slidably engaging one of the guide slots such that the second element is adjustable relative to the first element. Therein, the guide elements comprise at least two different types of guide elements.

By this, the adjusting device may particularly be manufactured with a reduced weight and a smaller number of parts.

One type of guide elements of the at least two different types of guide elements may comprise one or more guide bolts.

Further, one of the at least two different types of guide elements comprises one or more guide pins. For example, a first type of guide elements of the at least two different types of guide elements comprises guide bolts and a second type of guide elements of the at least two different types of guide elements comprises guide pins (having no bolt heads).

The at least two different types of guide elements may have different shapes. Alternatively or in addition, the at least two different types of guide elements may be made of different materials.

Each guide element of one of the at least two different types of guide elements may extend through a corresponding guide slot and beyond a surface of the second element facing away from the first element. Optionally, each guide element of another one of the at least two different types of guide elements may extend into a corresponding guide slot and terminate at or below said surface of the second element (before reaching said surface).

In an embodiment, the guide elements comprise two guide bolts and two guide pins, in particular exactly two guide bolts and exactly two guide pins.

Obviously, the adjusting device according to the second aspect may be combined with the adjusting device according to the first aspect. Accordingly, features mentioned above with respect to the adjusting device according to the first aspect may also be implemented in an embodiment of an adjusting device according to the second aspect and vice versa.

According to a third aspect an adjusting device for a vehicle seat comprises a first element, a second element having guide slots, guide bolts, each of the guide bolts being fixedly connected with the first element, slidably engaging one of the guide slots such that the second element is adjustable relative to the first element, and having a bolt head securing the second element to the first element, and at least one cover part covering the bolt head of a guide bolt and the corresponding guide slot.

This may prevent the bolt heads of at least one guide bolt from scraping against a part of a seat cushion attached to the second element to reduce wear.

According to an embodiment, the bolt head of each guide bolt is covered by each one cover part. Optionally, the first element has four guide slots wherein each of the four guide slots is engaged by a guide bolt and covered by a (respective) cover part.

The cover part may be attached to a slide bushing being arranged on and/or being at least partially arranged in the corresponding guide slot. The cover and the guide slot may be formed in one piece.

According to an embodiment, the cover part is arranged on a side of the second element facing away from the first element.

Obviously, the adjusting device according to the third aspect may be combined with the adjusting device according to the first aspect and/or with the adjusting device according to the second aspect. Accordingly, features mentioned above with respect to the adjusting device according to the first aspect and according to the second aspect may also be implemented in an embodiment of an adjusting device according to the third aspect and vice versa.

According to another embodiment, a covered slide bushing for a vehicle seat adjustment device is provided. The covered slide bushing comprises an elongate bushing part that may be inserted in a guide slot of the adjusting device and that defines a slot for receiving a guide bolt. The covered slide bushing further comprises an elongate cover part that is adapted for covering a bolt head of a guide bolt received in the slot. The bushing part and the cover part may be formed in one piece, e.g. via one or more film hinges. The adjusting device according to any aspect or embodiment described herein may be provided with one or more of such covered slide bushings.

According to an aspect, a vehicle seat comprising an adjusting device according to any aspect of embodiment described herein is provided.

BRIEF DESCRIPTION OF THE DRAWINGS

The previously mentioned and other advantages of the present solution will be apparent to those skilled in the art upon consideration of the following specification and the attached drawings.

DETAILED DESCRIPTION

Figure 1:
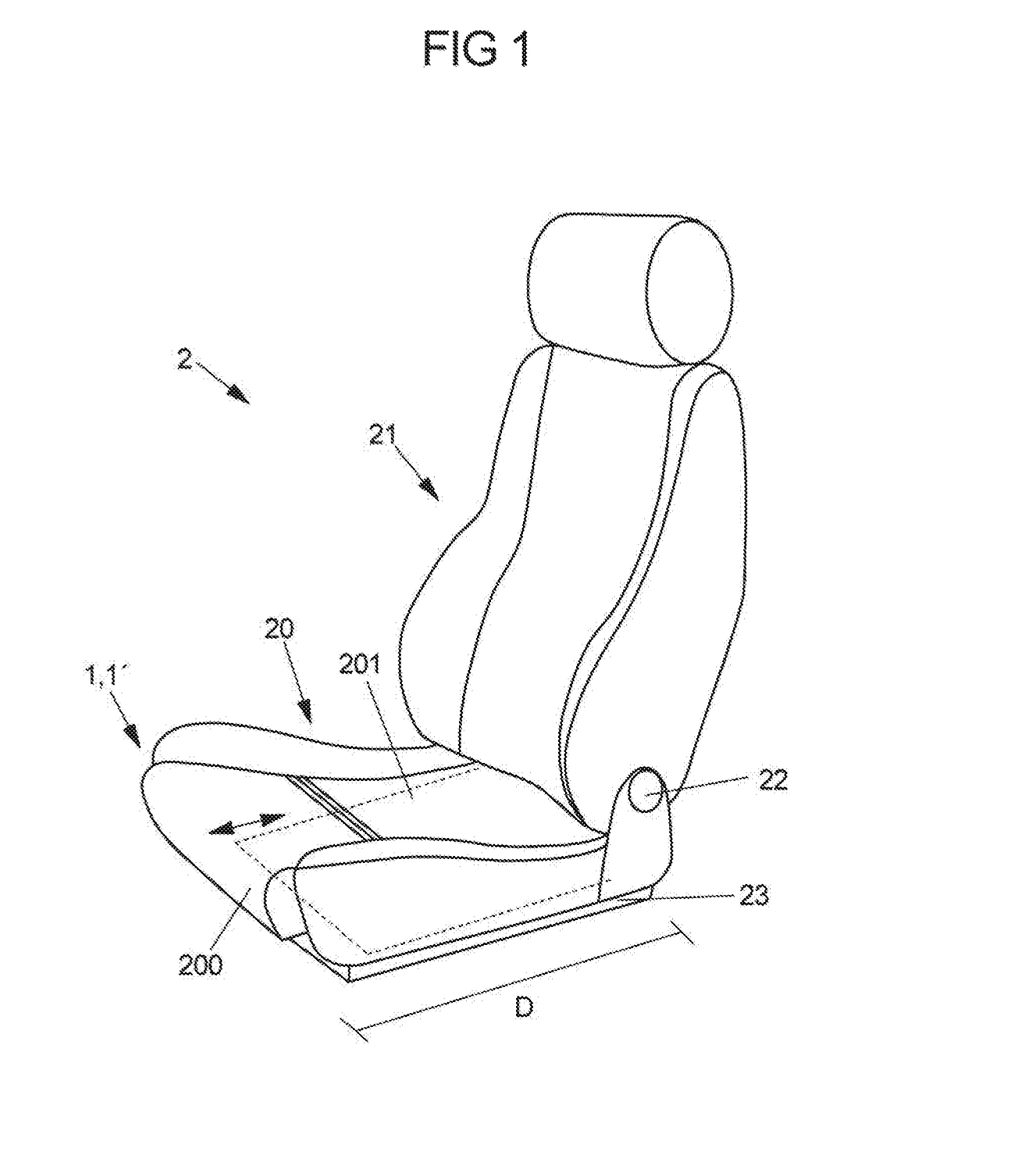
FIG. 1 is a perspective view on a vehicle seat.

FIG. 1 shows a vehicle seat 2 having a seating portion 20 and a backrest portion 21. The backrest portion 21 is pivotably mounted with respect to the seating portion 20 by means of a pair of recliners 22.

The seating portion 20 is supported on a base 23. The base 23 may be mounted on a longitudinal adjusting device or fixed to a vehicle floor. As shown in FIG. 1 the seating portion 20 comprises a first seat cushion part 200 and a second seat cushion part 201. While the second seat cushion part 201 is fixedly mounted with respect to the base 23, the first seat cushion part 200 may be adjusted relative to the second seat cushion part 201. In other words, the first seat cushion part 200 may translate with respect to the second seat cushion part 201 along a longitudinal direction. By this relative movement, a seat cushion length and, thus, a seat depth D of the seating portion may be adjusted. The seat depth D is measured as the distance from a rear end of a seating area of the seating portion 200 located adjacent the backrest portion 21 to a front end of the seating area located furthest from the backrest portion 21.

For effecting the relative movement of the first seat cushion part 200 relative to the second seat cushion part 201, the vehicle seat 2 comprises an adjusting device 1, 1'.

Figure 2:
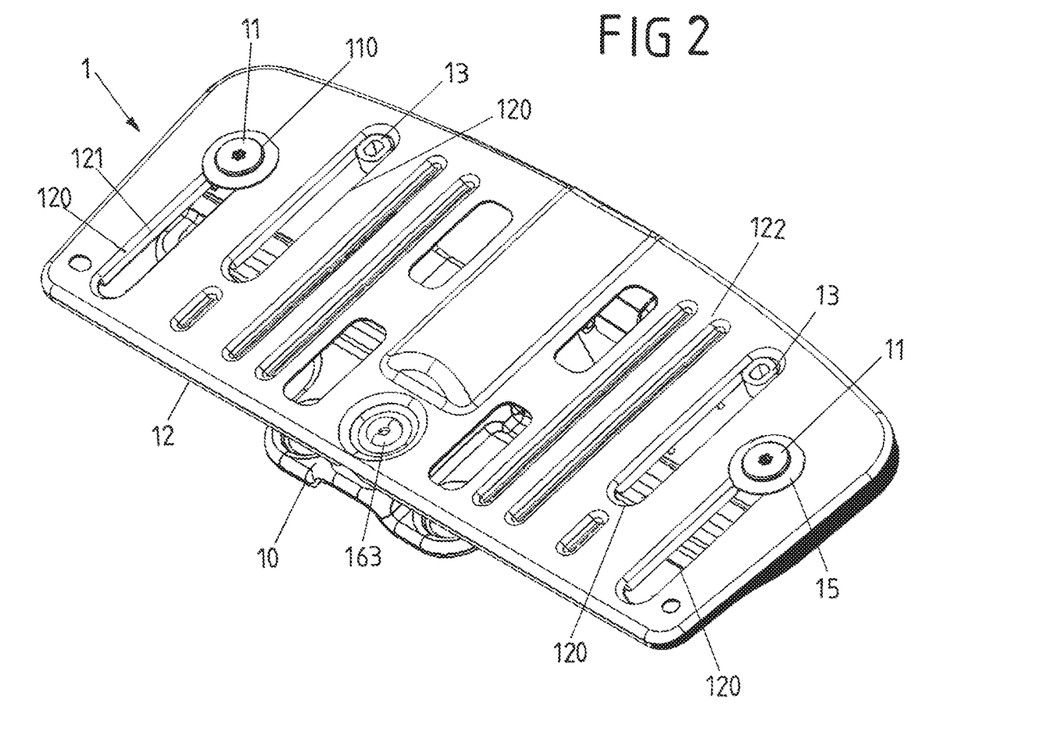
FIG. 2 is a perspective view on an adjusting device for the vehicle seat according to FIG. 1.

FIG. 2 shows an embodiment of an adjusting device 1 for the vehicle seat 2 according to FIG. 1, i.e., the vehicle seat 2 of FIG. 1 may comprise the adjusting device 1 of FIG. 2.

In many cases it is desirable to provide adjusting devices for vehicle seats that are robust against wear, easy to manufacture and comprise only few parts.

The adjusting device 1 comprises a first element 10 (here, the first element is a base plate), a plurality of fasteners, such as, guide bolts 11, more precisely, (exactly) two guide bolts 11, and a second element 12 (here, the second element is a cushion carrier). In use, the first element 10 is arranged below the second element 12. The first element 10 is or may be fixedly mounted with respect to the base 23 and/or the second seat cushion part 201 of the vehicle seat 2. For example, the first element 10 is a base plate that is fixed to the base 23 or part of the base 23. Alternatively, the first element 10 is fixed to a cushion pan (shown by dashed lines in FIG. 1) or is a part of the cushion pan of the seating portion 20. The second element 12 is adapted to support the first seat cushion part 200. For example, a foam of the first seat cushion part 200 is attached to the second element 12. The second element 12 may form a part of a seat pan of the vehicle seat 2.

The second element 12 has a major surface 122. The major surface 122 faces away from the first element 10. In the major surface 122, a plurality of (four) guide slots 120 is formed. Each of the guide slots 120 extends along a straight line. All guide slots 120 are oriented parallel to one another. The guide slots 120 are arranged in two pairs. The guide slots 120 of each of the two pairs are arranged adjacent to one another and close to a left and right side edge, respectively, of the second element 12. The two guide slots 120 of each pair are arranged with an offset in the longitudinal direction.

The guide bolts 11 are fixedly mounted with respect to the first element 10 and project therefrom. Each one of the two guide bolts 11 engage and extend through one of the guide slots 120. As shown in FIG. 2, the guide bolts 11 extend through the outer guide slots 120. The guide bolts 11 each have a bolt head 110 that may have a diameter that is larger than a width of the respective guide slot 120. Thus, the second element 12 is secured on the first element 10 by means of the guide bolts 11. A washer 15 arranged between each of the bolt heads 110 and the second element 12 may reduce friction and serves as bushing.

The remaining guide slots 120, in the present example two guide slots 120 (more precisely, the two inner guide slots 120), are engaged by other components, different to the guide bolts 11. According to FIG. 2, the other components are guide elements (or guide features) of a different type compared to the guide bolt 11 type. In one example these guide elements are formed as protrusions or guide pins 13. Each of the (two) guide pins 13 engage a corresponding guide slot 120 of the second element 12. In contrast to the guide bolts 11, the guide pins 11 do not have a bolt head. Thus, during manufacturing of the adjusting device 1, the second element 12 may be plugged on the guide pins 13 in a simple manner.

Each of the guide slots 120 comprises side walls 121 along their longitudinal edges. The side walls 121 are formed by bending portions of the second element 12 vertically with respect to the major surface 122 of the second element 12. The side walls 121 may increase the stability of the guide slots 120.

The guide pins 13 together with the guide bolts 11 effectively prevent a rotational movement of the second element 12 relative to the first element 10, in particular during adjustment auf the first and second elements 10, 12 relative to one another.

Each guide pin 13 is hollow, but a solid construction is also possible. In a cross-section, each guide pin 13 has two opposing arc-shaped sections that are connected to one another by parallel straight sections. The straight sections may further improve the stability against a rotation of the second element 12.

FIG. 2 shows the rearmost adjusting position (shortest seat depth D) of the adjusting device 1. For adjusting the second element 12 relative to the first element 10, the adjustment device 1 comprises a drive mechanism 16.

Figure 3:
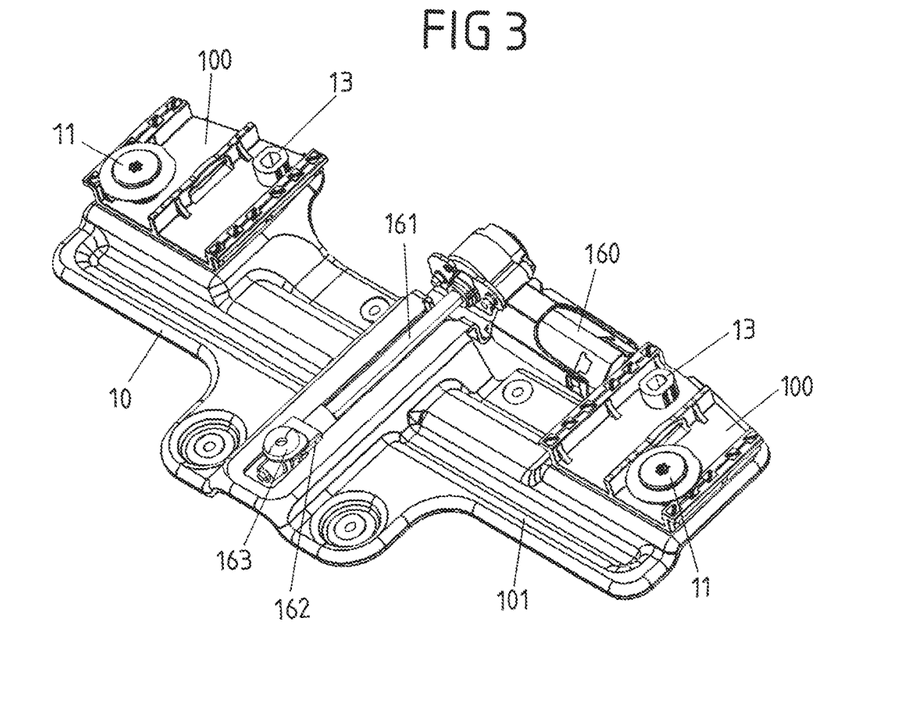
FIG. 3 is a perspective view on a first element of the adjusting device according to FIG. 2.

FIG. 3 shows the drive mechanism 16 in more detail. The drive mechanism 16 comprises a drive motor 160 that rotates a spindle 161 (by means of a gearing mechanism). The spindle 161 extends parallel to the guide slots 120 when the second element 12 is mounted on the first element 10 as shown in FIG. 2. Further, the spindle 161 has the same or substantially the same length as the guide slots 120. Notably, the guide slots 120 all have the same or substantially the same length. For example, the adjusting device 1 allows a relative displacement of the first and second elements 10, 12 to one another by about 40 to 60 mm in the forward/rearward directions.

A spindle nut 162 is mounted on the spindle 161 and comprises a connector 163. The connector 163 is mounted on the second element 12 (see FIG. 2). Thereby, a rotation of the spindle nut 162 around the spindle axis is prevented. Therefore, when an activation of the drive motor 160 rotates the spindle 161, the spindle nut 162 is displaced along the spindle 161 in a direction corresponding to the rotational direction of the spindle 161. The spindle nut 162 then drives the second element 12. The motion of the second element 12 is guided by means of the guide bolts 11 and the guide pins 13, over which the respective guide slots 120 slide.

As can be further seen from FIG. 3, the first element 10 comprises two sliders 100 (in the form of slider blocks), in the present example one on each lateral edge of the first element 10. The guide pins 13 are arranged on a respective one of the sliders 100. More precisely, one guide pin 13 projects from each of the sliders 100. Each of the sliders 100 is formed in one piece with the respective guide pin 13. The sliders 100 and guide pins 13 may be made of a plastics material. For example, the sliders 100 including the guide pins 13 are molded parts. This may further simplify the manufacturing and reduce the assembly time.

It is worth noting that by using only two guide screws 11, the manufacturing may be simplified and the weight and cost may be decreased.

The sliders 100 are mounted on a base plate 101 of the first element 10. The guide bolts 11 are arranged each at one of the sliders 100. The guide bolts 11 may be mounted to the sliders 100 and/or to the base plate 101, e.g. by means of nuts. It should be noted that instead of the base plate 101, the sliders 100 alternatively may also be fastened to a cushion pan of the seating portion 2 of the vehicle seat 2.

Figure 4:
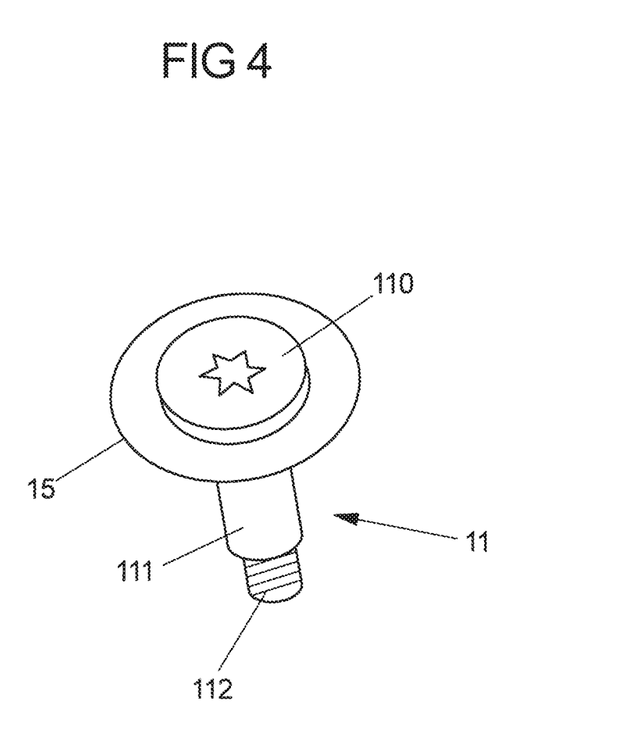
FIG. 4 is a perspective view on a guide bolt of the adjusting device according to FIG. 2.

FIG. 4 shows one of the guide bolts 11 including the washer 15. The guide bolt 11 comprises a cylindrical shoulder portion 111 connecting the bolt head 110 with a threaded portion 112. In the mounted state, the cylindrical shoulder portion 111 is in sliding contact with the side walls 121 of the corresponding guide slot 120. The threaded portion 112 for example extends through corresponding holes in the slider 100 and the base plate 101 and is secured by a nut. The guide bolt 11 is a shoulder bolt.

Figure 5:
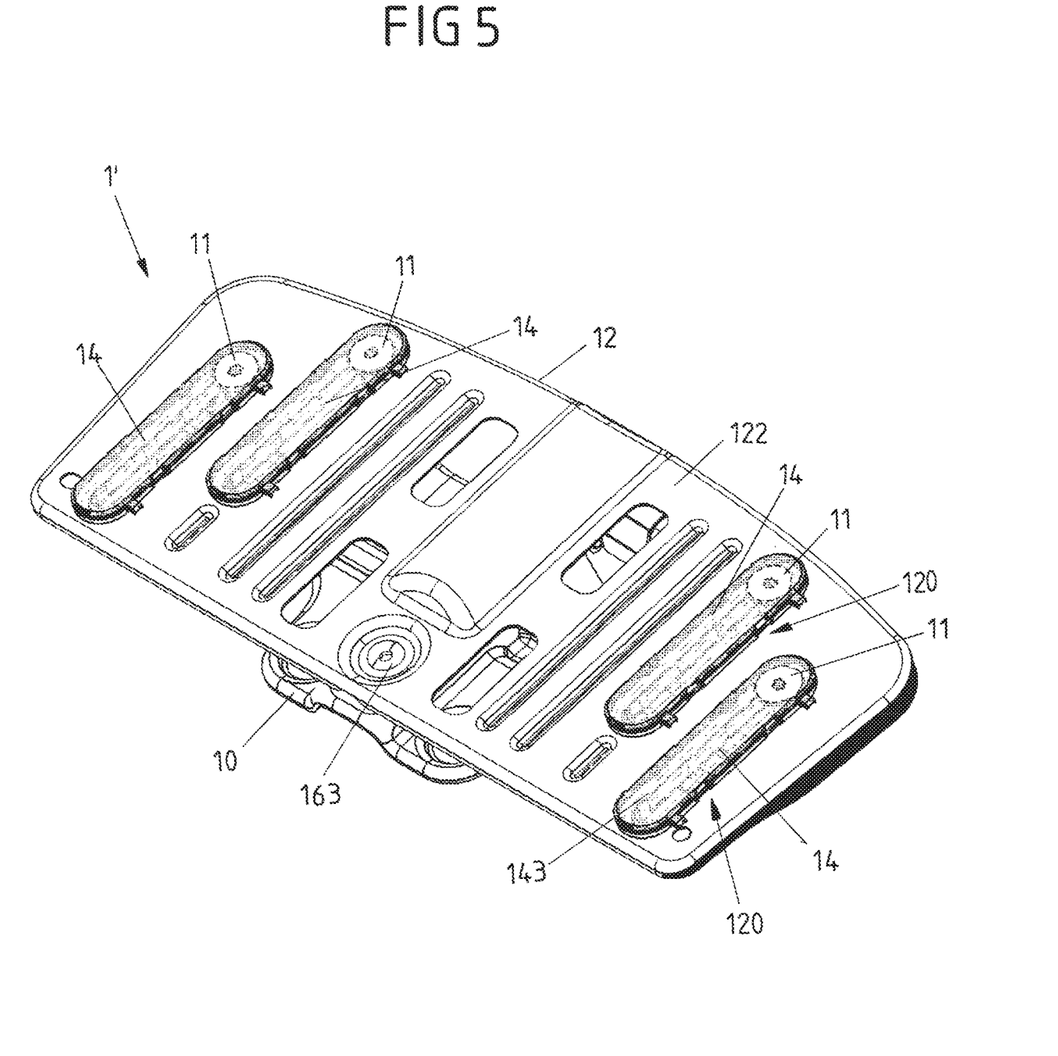
FIG. 5 is a perspective view on an adjusting device for the vehicle seat according to FIG. 1.

Turning now to FIG. 5, another embodiment of an adjusting device 1' will be explained. The adjusting device 1' according to FIG. 5 is similar to the adjusting device 1 according to FIG. 2, so in the following only the differences are described.

The adjusting device 1' of FIG. 5 comprises four guide bolts 11, one for each of the four guide slots 120 of the second element 12. Further, each of the four guide slots 120 is engaged not only by the respective guide bolt 11, but also by one other component each. In the example of FIG. 5, each of the other components are provided as a covered linear bushing or slide bushing 14. The covered slide bushings 14 have several purposes. The covered slide bushings 14 provide a slide bushing between the respective guide bolt 11 and the second element 12. Further, a cover part 143 of each the covered slide bushings 14 covers the corresponding bolt head 110 and thus protects the underside of a seat cushion foam material from rubbing by the bolt heads 110. Optional foam shields are not necessary. Even further, the cover part 143 completely encloses the respective guide slot 120 of the second element 12, thus preventing debris from entering. This helps in increasing the lifetime and maintaining a smooth and quiet operation of the adjusting device 1'. Further, optional grease on the bolt heads 110 is enclosed and not exposed.

Figure 6A:
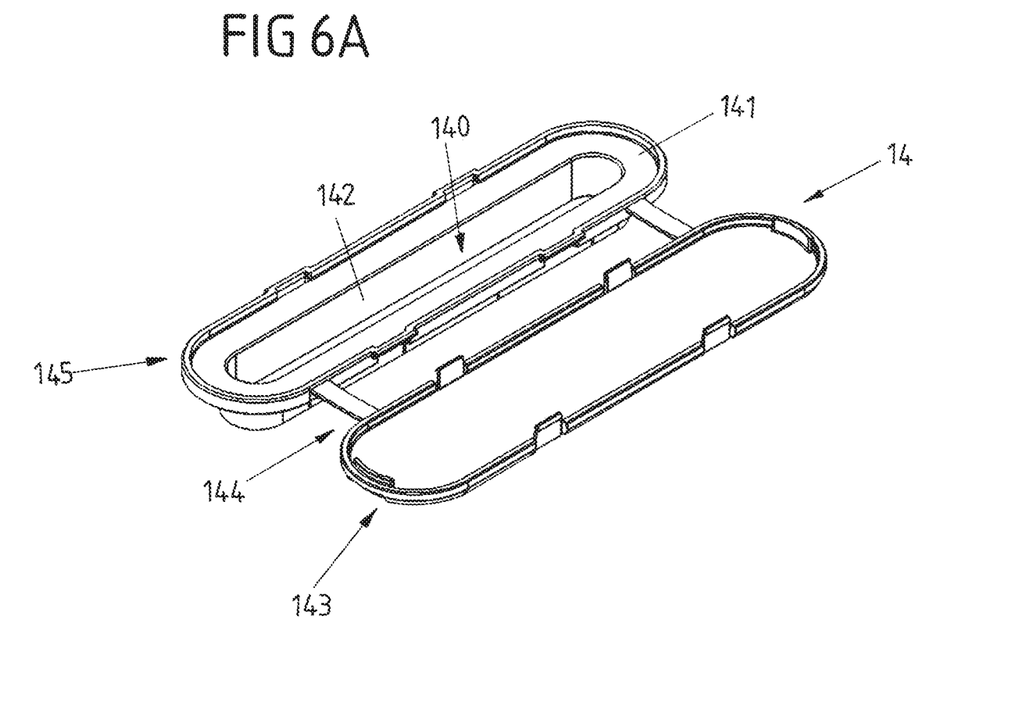
FIG. 6A and FIG. 6B are perspective views on a covered slide bushing in an opened state and in a closed state, respectively.
Figure 6B:
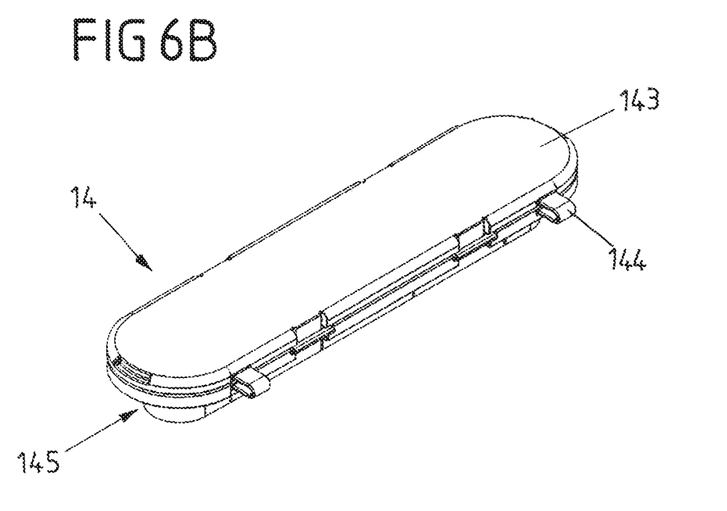

FIGS. 6A and 6B show one of the covered linear bushing or slide bushings 14 more detail. The covered slide bushing 14 comprises a bushing part 145 and the cover part 143, the two being connected with one another via one or more hinges, such as a living hinge 144. The one or more hinges may be film hinges. The hinge 144 may be configured to move from between a folded state, when the cover part 143 engages the slide bushing 14, and an unfolded state, when the cover part 143 is disengaged from the slide bushing 14. The covered slide bushing 14 is a molded plastic part and manufactured in one piece by injection molding. The bushing part 145 is a slide bushing.

The bushing part 145 is inserted into a guide slot 120 of the second element 12 and itself forms a slot 140 (compared to the adjusting device of FIG. 2, the guide slots may be correspondingly larger or the guide bolts 11 thinner). The slot 140 receives the guide bolt 11. The bolt head 110 then slidingly contacts an upper contact surface 141. The cylindrical portion 111 of the guide bolt 11 slidingly contacts an inner contact surface 142 of the bushing part 145.

After mounting the guide bolt 11, the cover part 143 may be closed by positioning the cover part 143 on the bushing part 145. Snap-on connections secure the cover part 143 to the bushing part 145. Additional snap-on connections may be provided at an outer surface of the bushing part 145 to secure the covered slide bushing 14 on the second element 12.

The cover part 143 of the covered slide bushing 14 may comprise a hole for inserting a tool, such as a screw driver. This is shown in FIG. 7.

Figure 7:
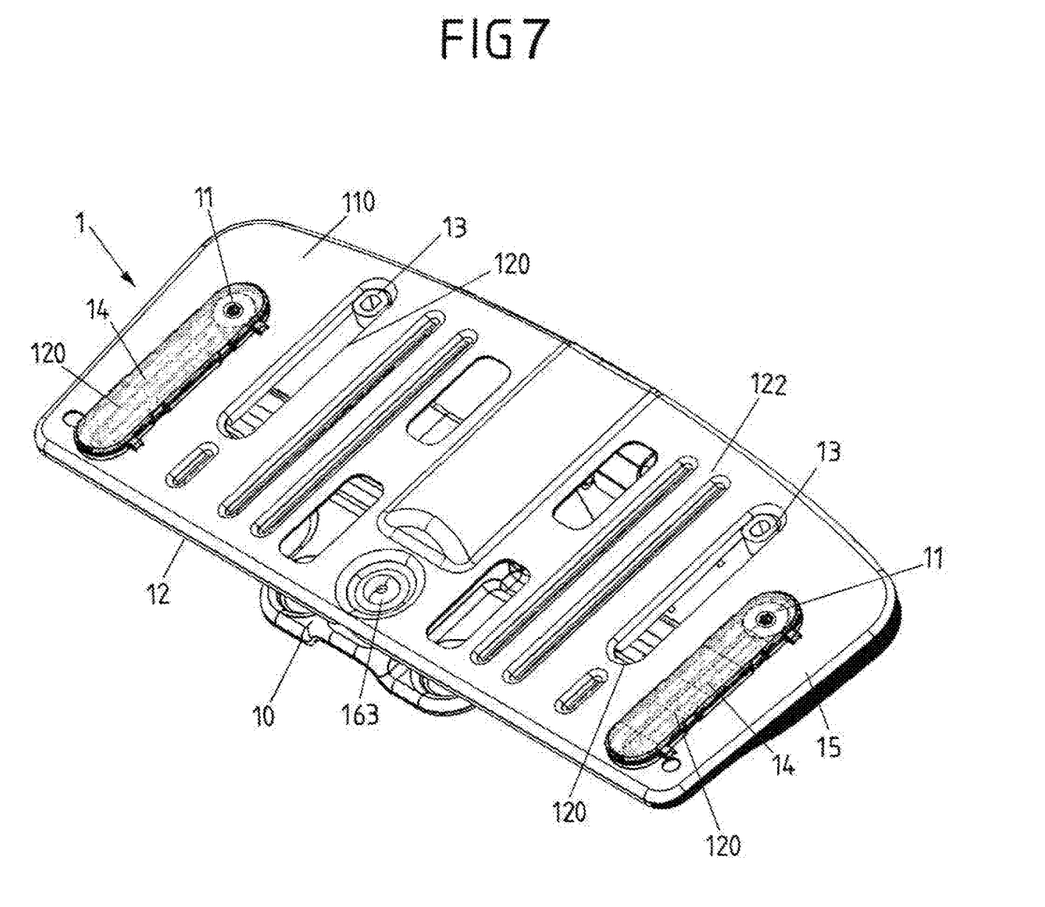
FIG. 7 is a perspective view on an adjusting device for the vehicle seat according to FIG. 1.

FIG. 7 further shows an embodiment having two covered guide bolts 11 and two guide pins 13 which are not covered.

Optionally, one or more (e.g., all) cover parts 143 may have stiffening ribs. Such stiffening ribs are indicated by dashed lines on the covered slide bushing 14 shown on the right side of FIG. 7.

Figure 8:
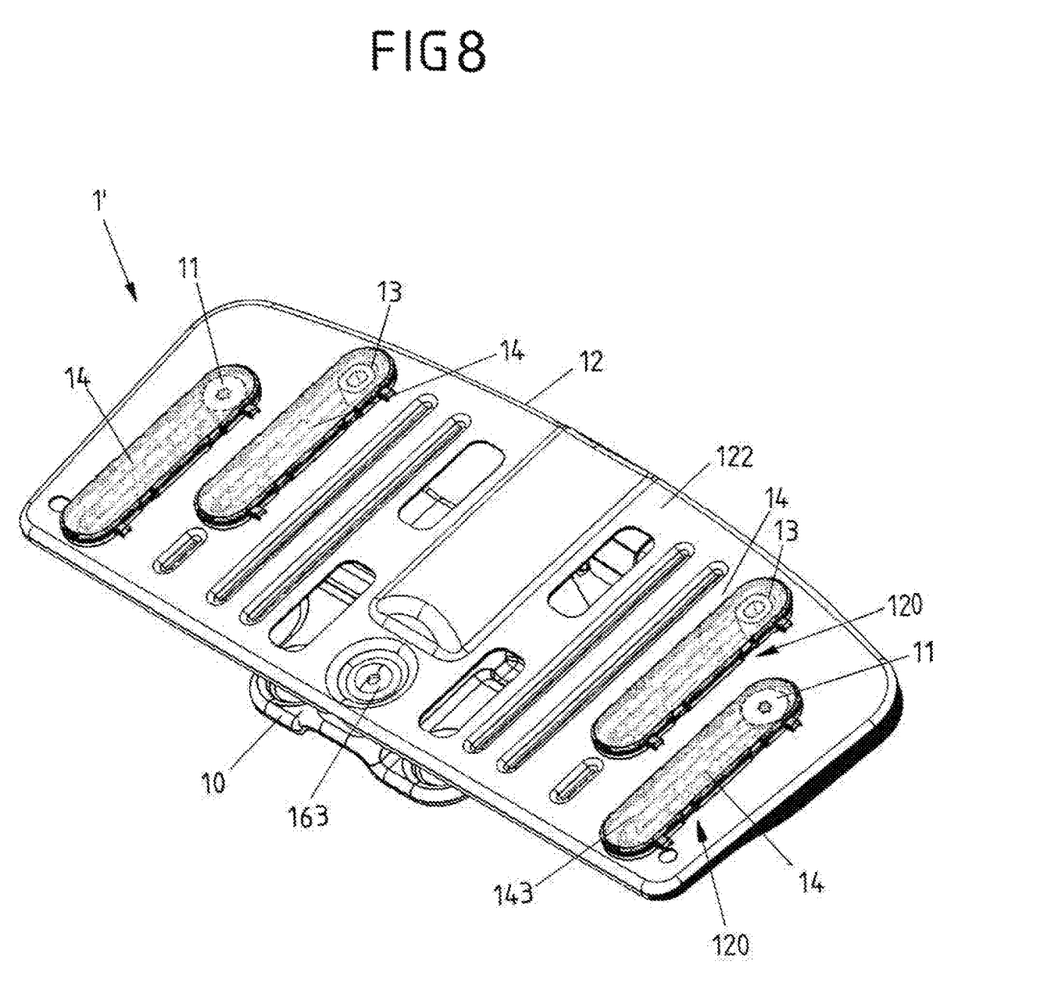
FIG. 8 is a perspective view on an adjusting device for the vehicle seat according to FIG. 1.

Obviously, also guide pins 13 according to FIG. 2 may be covered by covered slide bushings 14. This is shown in FIG. 8, according to which two guide bolts 11 and two guide pins 13 are provided. Therein, all of the guide bolts 11 and guide pins 13 are covered by a cover part 143 of a respective covered slide bushing 14.

Figure 9:
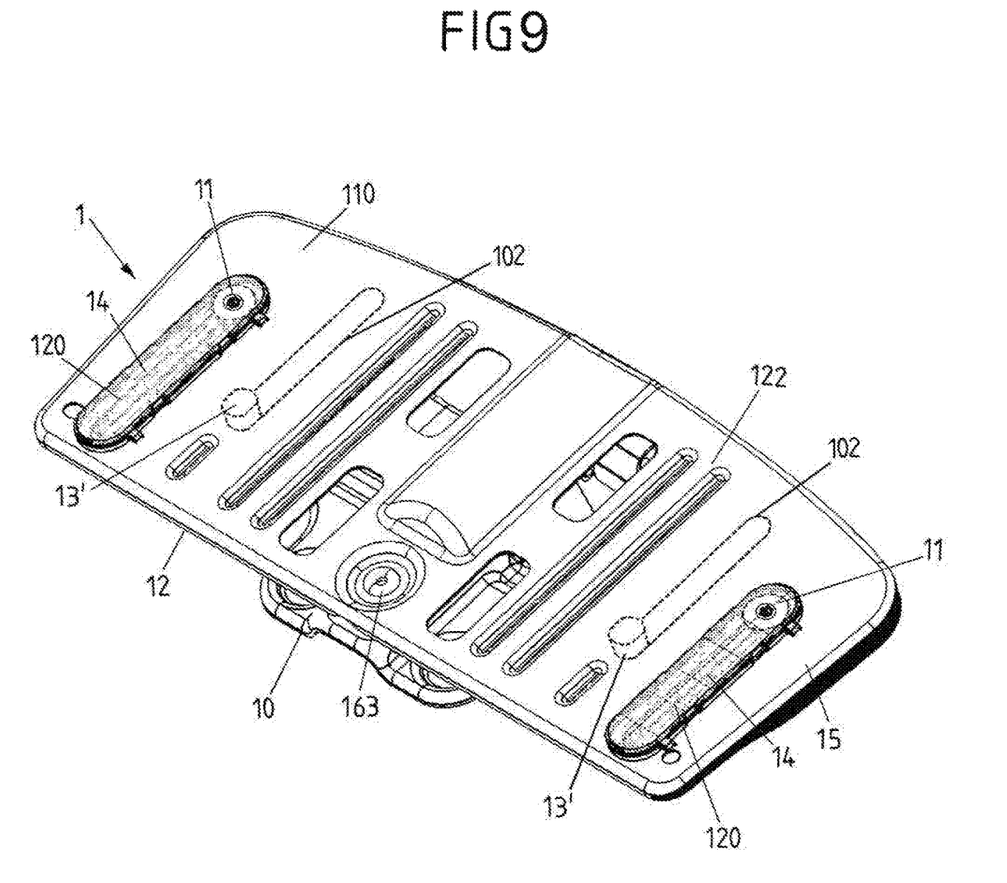
FIG. 9 is a perspective view on an adjusting device for the vehicle seat according to FIG. 1.

FIG. 9 shows another embodiment wherein the first element 10 includes (here: two) guide slots 102 (shown by dashed lines). For each of the guide slots 102 of the first element 10, the second element 11 includes a guide pin 13' which is received in the corresponding guide slot 102. In other words, in this embodiment both the first and the second element 10, 11 may include at least one guide slot 102, 120.

In the following, various embodiments will be described.

Embodiment 1 is an adjusting device for use in a vehicle seat including a base and a first seat cushion part configured to translate in a longitudinal direction with respect to a second cushion part fixed to the seat base, the adjusting device, comprising: a base plate attachable to the second cushion part; a cushion carrier configured to carry the first seat cushion part in the longitudinal direction and defining a first guide slot and a second guide slot; a guide bolt, fixed to the base plate and disposed within the first guide slot to secure the cushion carrier to the base plate; and a guide pin coupled to the base plate and extending into the second guide slot, wherein the guide bolt engages the first guide slot and the guide pin engages the second guide slot as the cushion carrier translates in the longitudinal direction.

Embodiment 2 is the adjusting device of embodiment 1, further comprising a first slide bushing disposed between the guide bolt and a sidewall of the first guide slot.

Embodiment 3 is the adjusting device of embodiment 2, further comprising a cover that engages the slide bushing and covers the guide bolt and first guide slot.

Embodiment 4 is the adjusting device of embodiment 3, wherein the cover is connected to the first slide bushing by a hinge.

Embodiment 5 is the adjusting device of embodiment 4, wherein the hinge is a living hinge configured to move between a folded state, when the cover engages the slide bushing, and an unfolded state when the cover is disengaged from the slide bushing.

Embodiment 6 is the adjusting device of embodiment 4, wherein the hinge, slide bushing, and the cover are integrally formed together by injection molding.

Embodiment 7 is the adjusting device of embodiment 2, further comprising a second slide bushing disposed between the guide pin and a sidewall of the second guide slot.

Embodiment 8 is the adjusting device of embodiment 1, further comprising a slider fixed to the base plate wherein the guide pin outwardly extends from the slider.

Embodiment 9 is the adjusting device of embodiment 1, wherein the guide bolt is a shoulder bolt provided with a head, a threaded portion, and a cylindrical shoulder portion extending therebetween, wherein the cylindrical shoulder portion engages a sidewall of the first guide slot.

Embodiment 10 is the adjusting device of embodiment 1, wherein the first guide slot has a first width and the head of the shoulder bolt has an outer diameter that is wider than the first width of the guide slot.

Embodiment 11 is the adjusting device of embodiment 10, further comprising a washer that is disposed between the head of the shoulder bolt and the cushion carrier.

Embodiment 12 is the adjusting device of embodiment 1, further comprising: a drive mechanism including, a drive motor fixed to the base plate, a spindle operatively coupled to the drive motor, and a spindle nut fixed to the cushion carrier wherein as the spindle rotates the spindle nut and cushion carrier translates along the longitudinal direction.

Embodiment 13 is a vehicle seat comprising: a base plate attached to a base of the vehicle seat; a cushion carrier configured to translate in a longitudinal direction to carry a first cushion part away from the base of the vehicle seat and defining a first guide slot and a second guide slot; a first fastener fixed to the base plate and disposed within the first guide slot; and a first protrusion coupled to the base plate and extending into the second guide slot, wherein the first fastener engages the first guide slot and the first protrusion engages the second guide slot as the cushion carrier translates in the longitudinal direction.

Embodiment 14 is the vehicle seat of embodiment 13, wherein the first guide slot and the second guide slot are offset from one another in a longitudinal direction.

Embodiment 15 is the vehicle seat of embodiment 13, further comprising a second fastener and a second protrusion, wherein the cushion carrier further defines a third guide slot and a fourth guide slot, and wherein the second fastener is fixed to the based plate and disposed within the third guide slot and the second protrusion is coupled to the based plate and extend into the fourth guide slot.

Embodiment 16 is an adjusting device for a vehicle seat, comprising: a base plate configured to be attached to a base of the vehicle seat; a cushion carrier configured to translate in a longitudinal direction to carry a first cushion part away from the base of the vehicle seat and defining a guide slot; a linear bushing disposed within the guide slot and including an inner contact surface; a guide bolt, fixed to the base plate and configured to engage the inner contact surface as the carrier translates in the longitudinal direction; and a cover wherein the cover is disposed between the linear bushing and the first cushion part when the adjusting device is assembled to the vehicle seat.

Embodiment 17 is the adjusting device of embodiment 16, wherein the cover is configured to move between an opened state and a closed state, wherein when the cover is in the closed state, the cover engages the linear bushing and covers guide bolt and guide slot.

Embodiment 18 is the adjusting device of embodiment 16, wherein the cover is connected to the linear bushing by a hinge.

Embodiment 19 is the adjusting device of embodiment 16, wherein the hinge is a living hinge configured to move between a folded state, when the cover engages the slide bushing, and an unfolded state when the cover is disengaged from the slide bushing.

What is claimed is:

1. An adjusting device for a vehicle seat, wherein the vehicle seat includes a first seat cushion configured to translate in a longitudinal direction with respect to a second cushion part, the adjusting device comprising:

a first element being attachable to the second cushion part;

a second element having guide slots, the second element being a cushion carrier configured to carry the first seat cushion part in the longitudinal direction; and guide elements, each of which being fixedly connected with the first element and slidably engaging one of the guide slots such that the second element is adjustable relative to the first element;

wherein the guide elements comprise at least two different types of guide elements; and wherein one guide element of the at least two different types of guide elements extends through the corresponding guide slot and beyond a surface of the second element facing away from the first element; and wherein another guide element of the at least two different types of guide elements extends into the corresponding guide slot and terminates at or below said surface of the second element facing away from the first element.

2. The adjusting device of claim 1, wherein one of the at least two different types of guide elements comprises guide bolts.

3. The adjusting device of claim 1, wherein one of the at least two different types of guide elements comprises guide pins.

4. The adjusting device of claim 1, wherein the at least two different types of guide elements have different shapes.

5. The adjusting device of claim 1, wherein the guide elements comprise two guide bolts and two guide pins.

6. An adjusting device for a vehicle seat wherein the vehicle seat includes a first seat cushion part configured to translate in a longitudinal direction with respect to a second cushion part, the adjusting device comprising:

a first element being attachable to the second cushion part;

a second element having guide slots, the second element being a cushion carrier configured to carry the first seat cushion part in the longitudinal direction;

guide bolts, each of which being fixedly connected with the first element, slidably engaging one of the guide slots such that the second element is adjustable relative to the first element, and having a bolt head securing the second element to the first element; and at least one cover part fixed to the second element and covering the bolt head of a guide bolt and the corresponding guide slot.

7. The adjusting device of claim 6, wherein the cover part is attached to a slide bushing at least partially arranged in the corresponding guide slot.

8. The adjusting device of claim 6, wherein the cover part is arranged on a side of the second element facing away from the first element.

* * * * *